(12) United States Patent
Krueger et al.

(10) Patent No.: US 10,434,470 B2
(45) Date of Patent: Oct. 8, 2019

(54) BOILER AND DEVICE FOR SELECTIVE NON CATALYTIC REDUCTION

(71) Applicant: General Electric Technology GmbH, Baden (CH)

(72) Inventors: Sascha Krueger, Bad Berka (DE); Joerg Krueger, Schwandorf (DE); Oliver Gohlke, Munich (DE)

(73) Assignee: General Electric Technology GMBH, Baden (CH)

( * ) Notice: Subject to any disclaimer, the term of this patent is extended or adjusted under 35 U.S.C. 154(b) by 47 days.

(21) Appl. No.: 15/544,933

(22) PCT Filed: Jan. 12, 2016

(86) PCT No.: PCT/EP2016/050441
§ 371 (c)(1),
(2) Date: Jul. 20, 2017

(87) PCT Pub. No.: WO2016/062901
PCT Pub. Date: Apr. 28, 2016

(65) Prior Publication Data
US 2017/0354927 A1 Dec. 14, 2017

(30) Foreign Application Priority Data
Jan. 20, 2015 (EP) .................................. 15151714

(51) Int. Cl.
*B01D 53/79* (2006.01)
*B01D 53/56* (2006.01)
(Continued)

(52) U.S. Cl.
CPC ............ *B01D 53/79* (2013.01); *B01D 53/56* (2013.01); *F23J 15/003* (2013.01); *F23J 15/04* (2013.01);
(Continued)

(58) Field of Classification Search
CPC ....................................................... B01D 53/79
See application file for complete search history.

(56) References Cited

U.S. PATENT DOCUMENTS 3,647,198 A * 3/1972 Munson .................. C21C 5/462
266/226
4,813,384 A * 3/1989 Zalewski .................. F28G 1/16
122/379

(Continued)

FOREIGN PATENT DOCUMENTS

CN 102380307 A 3/2012
CN 202606021 U 12/2012

(Continued)

OTHER PUBLICATIONS

Kruger, J., et al., "Steigerung der Effizienz von SNCR-Anlagentechnik Jorg Kruger," VGB PowerTech, vol. 4, pp. 100-106 (2012) (Abstract).

(Continued)

*Primary Examiner* — Nathaniel Herzfeld
(74) *Attorney, Agent, or Firm* — Pertu Juhana Henttonen; Hoffman Warnick LLC (57) ABSTRACT

The boiler (1) has side tubed walls (2) enclosing an inner space (3) and a device for selective non catalytic reduction (7). The device for selective non catalytic reduction (7) has a lance (8) carrying a hose (9) having at least a nozzle (10) and a hose drive mechanism (11) for driving the hose within the lance. The lance (8) protrudes into the inner space (3) from a side tubed wall (2) of the boiler (1).

15 Claims, 7 Drawing Sheets

(51) Int. Cl.
*F23J 15/00* (2006.01)
*F23J 15/04* (2006.01)

(52) U.S. Cl.
CPC ............... *B01D 2251/2062* (2013.01); *B01D 2251/2067* (2013.01); *B01D 2257/402* (2013.01); *B01D 2257/404* (2013.01); *B01D 2258/0283* (2013.01); *B01D 2259/124* (2013.01); *F23J 2219/20* (2013.01); *Y02C 20/10* (2013.01)

(56) References Cited

U.S. PATENT DOCUMENTS

| | | | |
|---|---|---|---|
| 5,058,514 A * | 10/1991 | Mozes | B01D 53/60 110/345 |
| 5,252,298 A | 10/1993 | Jones | |
| 5,315,941 A * | 5/1994 | Vetterick | F23J 15/003 110/345 |
| 5,326,536 A * | 7/1994 | Carter | B01D 53/56 110/190 |
| 5,342,592 A * | 8/1994 | Peter-Hoblyn | B01D 53/56 423/235 |
| 5,585,072 A * | 12/1996 | Moskal | B01D 53/56 110/216 |
| 5,681,536 A * | 10/1997 | Swoboda | B01D 53/56 110/345 |
| 7,166,262 B2 * | 1/2007 | Buzanowski | B01D 53/8631 423/239.1 |
| 7,622,093 B2 * | 11/2009 | Arrol | B01D 53/56 423/210 |
| 2003/0124477 A1 * | 7/2003 | Hagstrom | F23C 9/08 432/72 |
| 2006/0008393 A1 | 1/2006 | Schindler | |
| 2006/0108443 A1 * | 5/2006 | Huffman | F23J 7/00 239/132 |
| 2015/0211403 A1 * | 7/2015 | Brunello | F01N 3/2066 134/10 |
| 2016/0209031 A1 | 7/2016 | Lou et al. | |

FOREIGN PATENT DOCUMENTS

| | | |
|---|---|---|
| CN | 204051973 U | 12/2014 |
| DE | 3 722 523 C1 | 6/1988 |
| EP | 1 256 761 A2 | 11/2002 |
| KR | 10-2004-0037984 A | 5/2004 |
| WO | 2012059184 A1 | 11/2010 |

OTHER PUBLICATIONS

Machine Translation and First Office Action and Search issued in connection with corresponding CN Application No. 201680000360.9 dated Jul. 26, 2017.

International Search Report issued in connection with corresponding PCT application No. PCT/EP2016/050441 dated Feb. 23, 2016.

European Search Report for corresponding EP Application No. 15151714.1, dated Apr. 22, 2015, 7 pages.

* cited by examiner

BOILER AND DEVICE FOR SELECTIVE NON CATALYTIC REDUCTION

FIELD OF INVENTION

The present invention relates to a boiler and a device for selective non catalytic reduction. In particular, the present invention refers to a boiler to be connected to steam turbines and electric generators for electric power generation. The boilers are provided with selective non catalytic reduction for $NO_x$ removal from the flue gas.

BACKGROUND OF THE INVENTION

Boilers comprise tubed walls defining an inner space; a fuel such as coal, oil, waste is supplied into the inner space and is combusted with an oxidizer, such as air or oxygen. During the combustion flue gas is generated that is rich in $NO_x$, whose amount has to be reduced below given limits before the flue gas is vented into the atmosphere.

In order to remove $NO_x$ from the flue gas, a regent such as ammonia ($NH_3$ as liquid solution) or urea ($CH_4N_2O$ as liquid solution) can be injected into the flue gas and the flue gas can be passed through a catalyzer, for the $NO_x$ to be converted into $N_2$ and $H_2O$ (selective catalytic reduction, SCR); this reaction occurs at low temperatures, e.g. between 250-450° C.

The catalyst is expensive and can be damaged during operation, for this reason a method has been developed according to which ammonia or urea are injected into the flue gas having a high temperature, e.g. in the range 750-1300° C., such that the $NO_x$ conversion into $N_2$ and $H_2O$ occurs without the need of a catalyst (selective non catalytic reduction, SNCR).

WO2012/059 184 discloses a boiler for waste to energy applications (i.e. waste is used as a fuel in the boiler). The boiler has an aperture at its top wall such that a device for selective non catalytic reduction is introduced into the inner space through this aperture. The device for selective non catalytic reduction has a tubular lance and a hose sliding into the lance. The hose has a nozzle at its end housed in the inner space. During operation the lance hangs from the top wall of the boiler and the hose extends from the lance; the reagent passes through the hose and is injected through the nozzles upwards.

The boiler of WO2012/059 184 was a relatively small boiler such as a boiler using waste as a fuel; nevertheless application of lances with hose carrying a nozzle hanging from the top of a boiler was difficult for large boilers, such as boilers using coal as a fuel. For example, in case of large boilers, the reagent passing through the hose could evaporate within the hose before it reaches the nozzle; this prevents injection with a proper penetration and mixing of the reagent with the flue gas and, therefore, low $NO_x$ removal from the flue gas.

SUMMARY OF INVENTION

An aspect of the invention includes providing a boiler and a device for selective non catalytic reduction in which the reagent can be injected into the inner space of a boiler with a reduced risk of evaporation or at least reduced risk of large evaporation of the reagent before it is injected.

A boiler comprising side tubed walls enclosing an inner space; and a device for selective non catalytic reduction, the device for selective non catalytic reduction comprising a lance carrying a hose comprising at least a nozzle and a hose drive mechanism for driving the hose within the lance; wherein the lance protrudes into the inner space from a side tubed wall of the boiler.

A device for selective non catalytic reduction comprising: a lance carrying a hose comprising at least a nozzle and a hose drive mechanism for driving the hose within the lance, wherein the lance is provided with a cooling system.

In embodiments, the area in which the reagent is injected can be optimized. This can be done for example by adjusting the horizontal position of the lance and/or by optimizing and/or adjusting the reagent injection.

BRIEF DESCRIPTION OF THE DRAWINGS

Further characteristics and advantages will be more apparent from the description of a non-exclusive embodiment of boiler, illustrated by way of non-limiting example in the accompanying drawings, in which.

DETAILED DESCRIPTION

With reference to the figures, these show a boiler 1 comprising side tubed walls 2 enclosing an inner space 3 and a top wall 4. The boiler is supplied with fuel such as coal and an oxidizer such as air or oxygen via burners 5.

The boiler also has a device 7 for selective non catalytic reduction SNCR; the device 7 comprises a lance 8 carrying a hose 9 having at least a nozzle 10; as shown. In an embodiment, the nozzle is at the hose terminal part that is housed within the inner space 3. The device 7 further has a hose drive mechanism 11 for driving the hose within the lance 8.

The figures show an example of a 2-pass boiler and in this case the device 7 is associated to the first pass, it is anyhow clear that the boiler can be any type of boiler and the device 7 can be located anywhere, at locations where temperatures for correct selective non catalytic reaction exist.

In an embodiment, the lance 8 protrudes into the inner space 3 from a side tubed wall 5 of the boiler. This way the length of the hose housed within the inner space 3 is shorter than in case the lance was hanging from the top wall 4 of the boiler, such that the reagent passing through the hose during operation does not evaporate or at least does not undergo evaporation to a large extent before it reaches the nozzle 10. In an embodiment, the lance 8 protrudes substantially horizontally.

Figure 1:
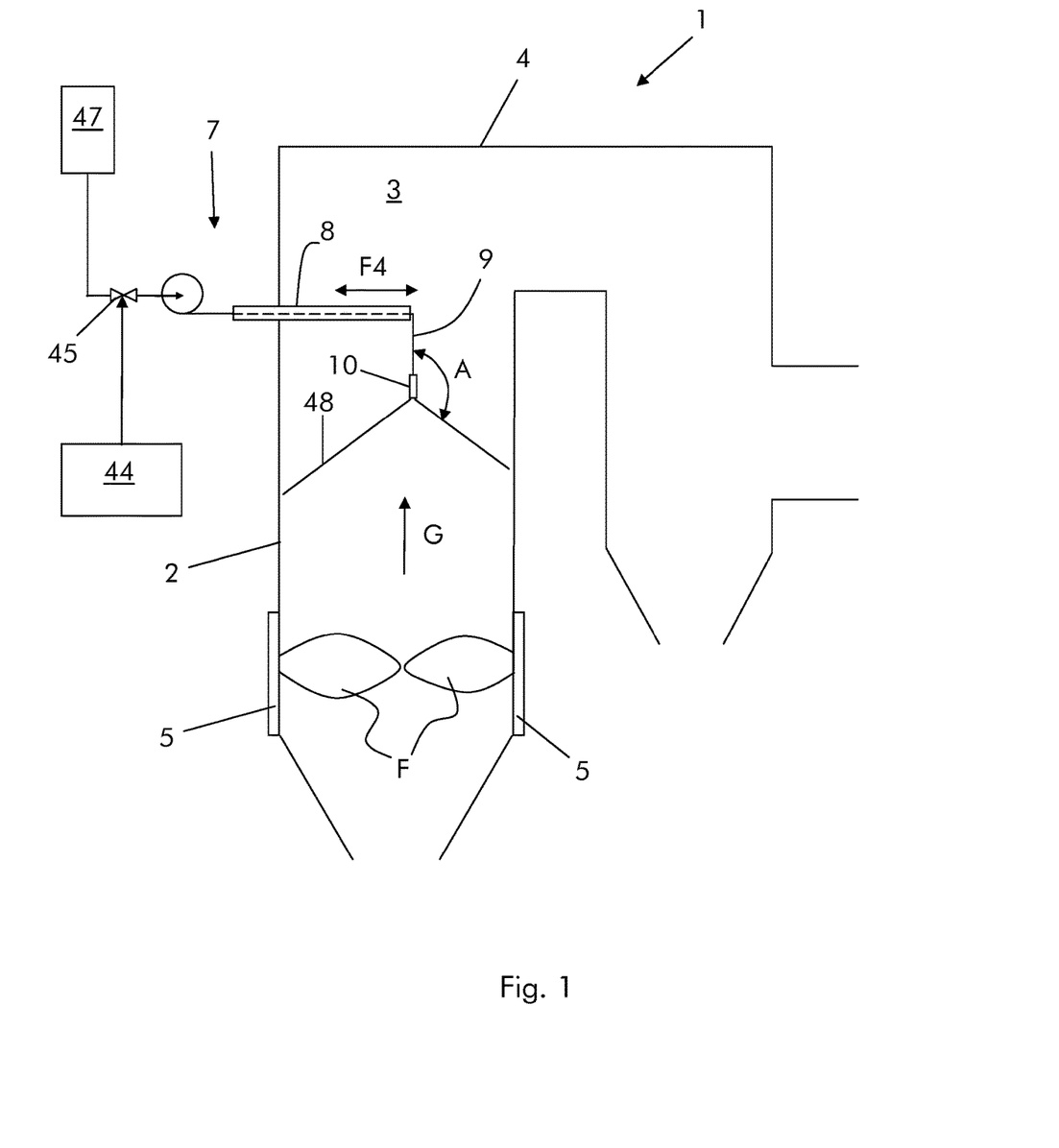
FIG. 1 shows a schematic boiler.
Figure 2:
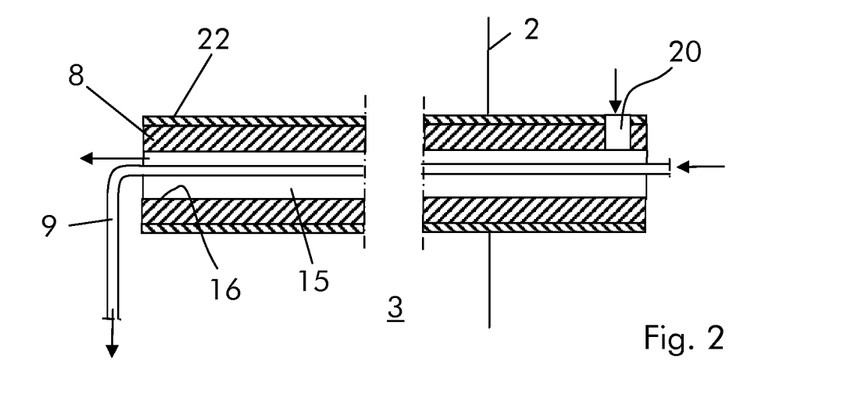
FIGS. 2, 3, and 4 show different embodiments of the lance.
Figure 3:
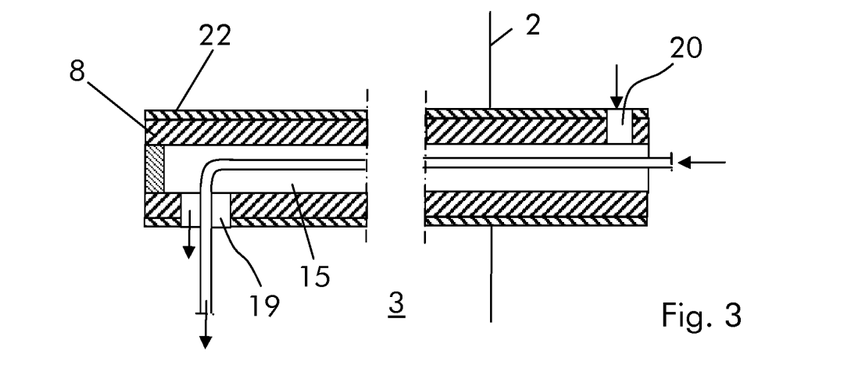
Figure 4:
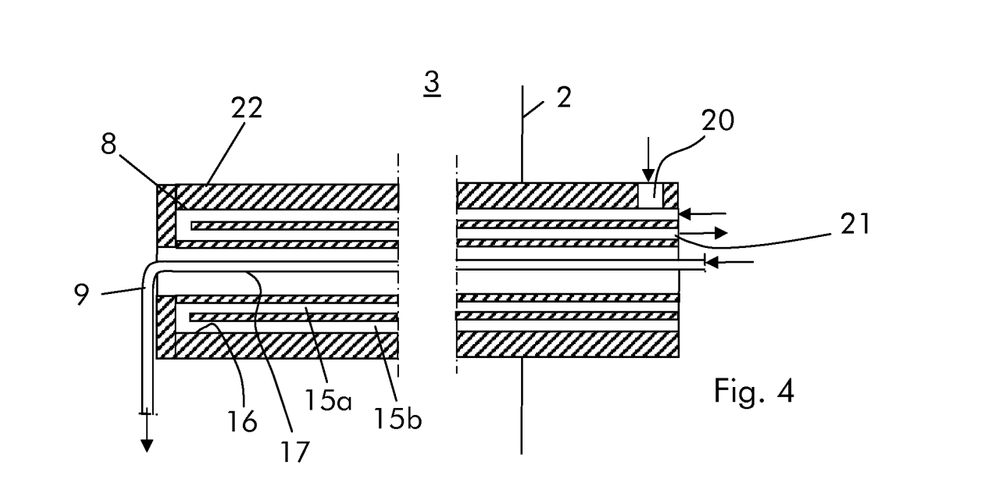

In order to further counteract the evaporation of the reagent, the lance 8 is provided with a cooling system, in an embodiment; FIGS. 2 through 4 show lances 8 with different cooling systems.

The cooling system comprises one or more channels 15 for a cooling medium such as air and/or another gas and/or steam and/or water. In an embodiment the channels 15 have an annular shape and are located between a lance wall 16 and the hose 9. For example, FIG. 2 shows a lance 8 with the hose 9 projecting from its open end; one annular channel 15 is defined between the wall 16 of the lance 8 and the hose 9. FIG. 3 shows a lance 8 having an opening 19 and the hose 9 projecting from this opening 19; one annular channel 15 is defined between the wall 16 of the lance 8 and the hose 9. FIG. 4 shows a lance 8 with the hose 9 projecting from its open end; two annular channels 15A, 15B are defined between the wall 16 of the lance 8 and the hose 9.

An inlet 20 into the channels 15, 15A, 15B for the cooling medium is located at a portion of the lance 8 outside the inner space 3 (FIGS. 2-4); in contrast, an outlet from the channels 15, 15A, 15B can be located at a portion of the lance 8 inside the inner space 3 (FIGS. 2 and 3) and can be defined by the opening 19 and/or the outlet can be located at a portion of the lance 8 outside the inner space 3 (FIG. 4) and can be defined by a dedicated opening 21.

In addition, the lance 8 can have an outer insulation layer 22 for thermally insulating the lance and protecting it against the flue gas. The outer insulation layer 22 is implemented if needed according to the heat removal capacity of the cooling system.

In case the cooling medium is air and/or another gas: when the air/other gas has a low pressure (for example air/other gas are supplied into the channels 15, 15A, 15B via a blower) the insulation layer 22 is typically needed; when the air/other gas has a medium pressure (for example air/other gas are supplied into the channels 15, 15A, 15B via a blower) the insulation layer 22 is typically not needed because the increased pressure of the air/other gas allows a sufficient heat removal; when the air/other gas has a high pressure (for example air/other gas are supplied into the channels 15, 15A, 15B via a compressor) the insulation layer 22 is typically not needed.

When the cooling medium is air/other gas it can be discharged into the inner space 3 of the boiler (i.e. the lance 8 can have the structure shown in FIG. 2 or 3); in fact, the air can allow further reaction of the fuel (i.e. it can act like overfire air).

In case the cooling medium is water it can be supplied to the channels 15, 15A, 15B at medium pressure typically without any need of outer insulating layer 22; in this case the water can be discharged either within the inner space 3 (like in FIGS. 2 and 3) or outside of the inner space 3 (like in FIG. 4).

In case the cooling medium is steam: it can be supplied into the channels 15, 15A, 15B at low pressure, typically without any need of the outer insulating layer 22; in this case the steam is discharged into the inner space 3 (like the lance shown in FIGS. 2 and 3); it can be supplied to the channels 15, 15A, 15B at high pressure, typically without any need of the outer insulating layer 22; in this case the steam is discharged outside of the inner space 3 (like the lance shown in FIG. 4).

Naturally the specific design of the lance, the presence of the outer insulating layer and the location of the inlet 20 and outlet, the configuration of the channels 15, 15A, 15B, the type of cooling means and the pressure of the cooling means can be any combination and will depend on the particular conditions.

In an embodiment, lance 8 is provided with a lance positioning system for regulating the position of the hose 9 within the inner space 3. In particular, the lance positioning system is arranged for regulating the position of the lance over its longitudinal axis 25.

Figure 15:
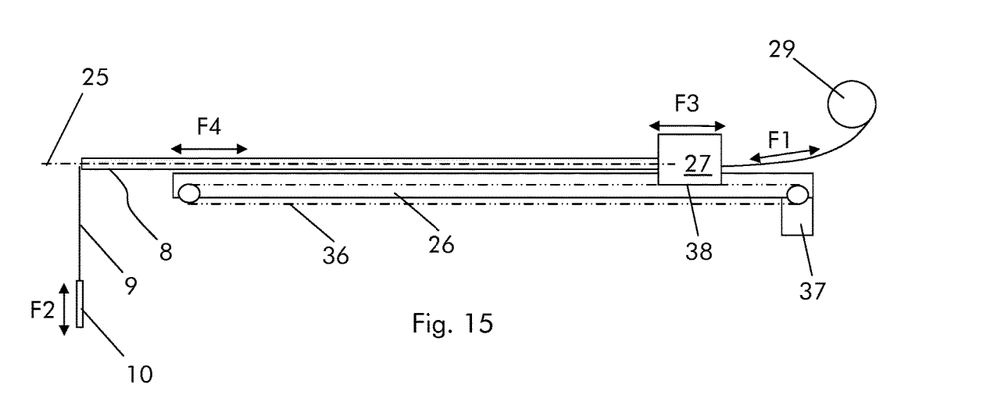
FIG. 15 shows a lance connected on a support beam.
Figure 16:
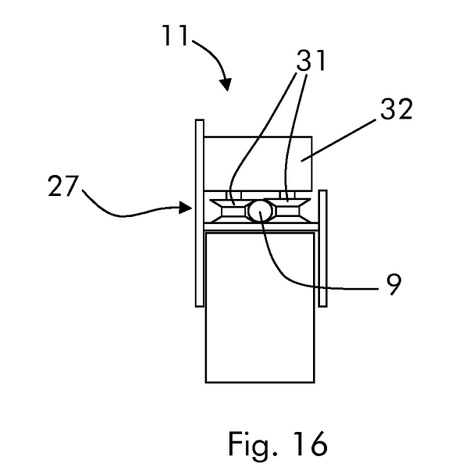
FIG. 16 shows a chariot connected to a support beam.

In one embodiment, the lance positioning system for regulating the position of the lance over its longitudinal axis comprises a lance support beam 26 and a chariot 27 movable on the support beam 26; the lance 8 is connected to the chariot 27.

According to an embodiment, drum 29 is also provided for carrying the hose 9; in further embodiments the drum 29 is not connected to the chariot 27; it can for example be connected to and supported by the support beam 26 or an external support.

The chariot 27 further supports the hose drive mechanism 11. The hose drive mechanism 11 has opposing wheels 31 through which the hose 9 passes through and a motor 32 for driving the wheels 31, such that during operation the wheels 31 drive the hose 9 and the drum 29 is only used to wind or unwind the hose 9. A drive system for example with a chain 36 and a motor 37 is used to drive the chariot 27 along the support beam 26. In this respect the chariot 27 is fixed to the chain 36 at a position 38.

Additionally, the device for selective non catalytic reduction can also have a side drive mechanism, for adjusting the side position of the lance 8.

Figure 17:
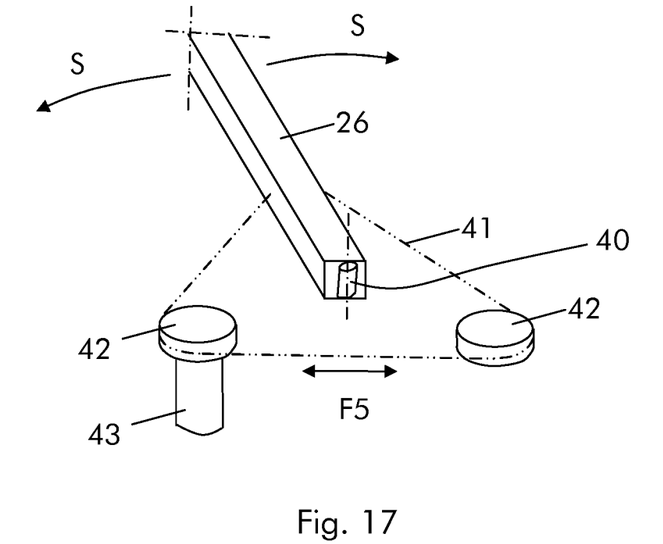
FIG. 17 shows an embodiment of a support beam with side position regulation.

In one embodiment, the side drive mechanism comprises a hinge 40 connected to the support beam 26 and a chain 41 having the ends connected to the support beam 26 and wheels 42; at least one of the wheels 42 is connected to a motor 43 for controlling and adjusting the side position over the arrows S.

Figure 18:
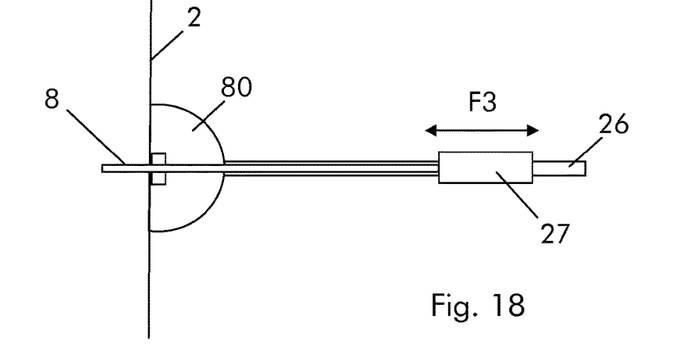
FIGS. 18, 19, and 20 show an embodiment of a support beam with lance side position regulation in different configurations.
Figure 19:
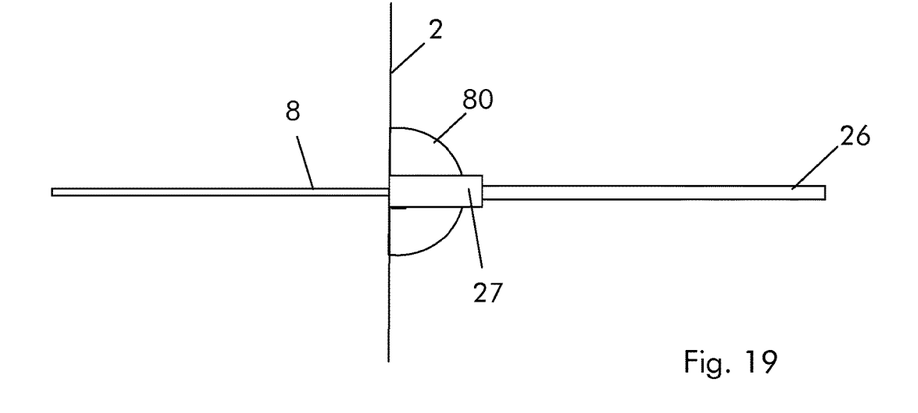
Figure 20:
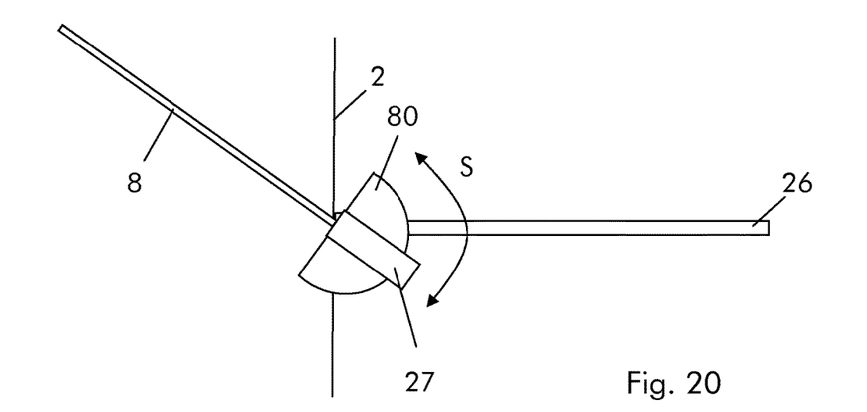

In an alternative embodiment, the side drive mechanism can comprise a platform 80 arranged to receive the chariot 27 (for example the platform can have rails adapted for receiving the chariot 27). The platform 80 is rotatably connected to the support beam 26 (in an embodiment, the platform 80 is rotatably connected to one end of the support beam 26 and rests outside of the inner space 3). During operation the chariot 27 can slide over the support beam 26 as indicated by the arrow F3 and can be driven above the platform 80; once the chariot is on the platform 80, the platform 80 can be rotated as indicated by the arrow S in order to regulate the side position of the lance 8. In one embodiment, the chariot can be fixed to the platform 80 when the platform 80 is rotated.

The boiler 1 further has a control system 44 for controlling the flow from the nozzle 10. In an embodiment of the control system 44 can be arranged for generating a pulsed flow through the nozzle 10. For example, the boiler comprises valves 45 connected to and driven by the control system 44 for generating the pulsed flow. In addition or as an alternative the reagent can be supplied via a pump that is controlled in order to provide the pulsed flow. Other means for generating the pulsed flow are naturally possible.

The operation of the boiler is apparent from that described and illustrated and is substantially the following.

Fuel and oxidizer are supplied into the inner space 3 and the fuel is combusted generating flames F and flue gas G that passes through the boiler. The flue gas contains $NO_x$ (mainly NO and lower amounts of $NO_2$) that has to be at least partly removed.

The lance 8 is introduced into the inner space 3 through a side opening of the side tubed wall 2; the opening can be an opening for different scopes, such as an inspection opening or a dedicated opening.

From the lance 8 the hose 9 and the nozzle 10 hang in the inner space 3.

The nozzle position can be adjusted both horizontally and vertically.

The nozzle position is adjusted vertically for the nozzle 10 to inject the reagent in zones where the temperature is the best for selective non catalytic reaction. The vertical adjustment can be done by operating the motor 32 in order to drive the wheels 31 for pushing/pulling the hose 9 through the lance 8 as indicated by arrow F1 and regulating the nozzle vertical position as indicated by the arrow F2.

The nozzle position is adjusted along the axis 25 (for example horizontally) to place the nozzle 10 in zones where the flue gas velocity (and thus the mass flow) is higher, because the most of the $NO_x$ passes through these zones. The nozzle position can be horizontally regulated along the support beam 26 by operating the motor 37 in order to drive the chariot 27 along the support beam 26 as indicated by the arrow F3. The movement of the chariot 27 causes the corresponding movement of the lance 8 along the support beam 26 as indicated by the arrow F4.

Additionally, the nozzle position can also be pivotally adjusted. This is often not needed because in particular for large boilers more than one lance are provided; anyway side adjustment could render regulation more flexible. In this case the regulation can be done by operating the motor 43 in order to move the chain 41 as indicated by the arrows F5 and thus pivot the support beam 26 (and the lance 8 supported by it) as indicated by the arrows S.

The position of the nozzle can be adjusted before the boiler is started, according the foreseeable operating conditions, but can also be changed during operation of the boiler, in response to changed operating conditions or to betted adapt the nozzle position to the current operating conditions and/or temperature distribution and/or flue gas velocity distribution.

During operation of the boiler 1, the hose 9 is supplied with a reagent such as ammonia or urea from a tank 47; the reagent passes through the hose 9 and is injected via the nozzle 10.

Different possibilities are available for the injection. In an embodiment, the reagent is injected over a conical surface 48 for example via a slot, but it can also be injected via a plurality of single jets each resting on a conical surface. In an embodiment, the angle A between the hose 9 and the flow injected through the nozzle 10 is in the range 0°<A<180°, more particularly it is in the range 90°<A<180° and more particularly it is in the range 135°<A<155°.

Figure 11:
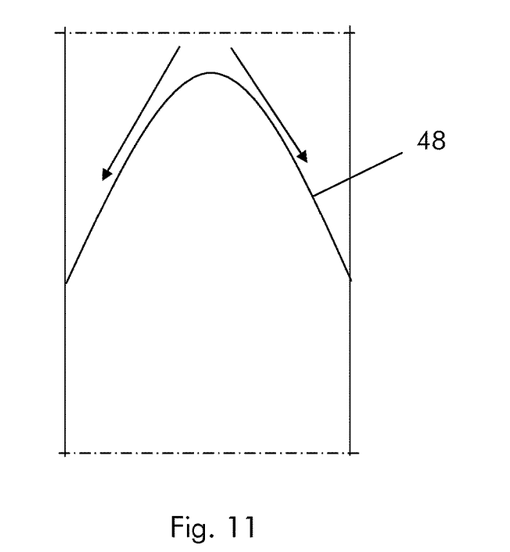
FIG. 11 shows an isothermal curve within the inner space of the boiler (above the flame)

An injection over a conical surface 48 defining an angle A between 90°-180° and 135°-155° in an embodiment which can be advantageous because it allows to spray the reagent over areas where the temperature is uniform. In fact, the temperature within the inner space 3 is lower close to the side tubed walls 2 and it is lower upwards (i.e. apart from the flame); therefore the isothermal curve has a bell shape with ends directed downwards and close to the tubed side walls 2 (FIG. 11). Therefore injection over a conical surface with apex at the top and directed downwards allows the reagent to intersect the flue gas having a substantially uniform or more uniform temperature than with other configurations.

FIGS. 5 through 10 show different embodiments of the nozzle 10.

Figure 5:
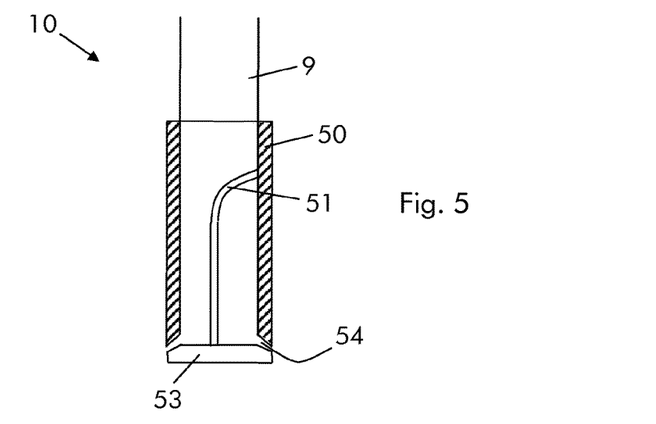
FIGS. 5, 6, 7, 8, 9, 10 show different embodiments of the nozzle.

FIG. 5 shows an embodiment in which the nozzle 10 has a body 50 (in an embodiment tubular in shape) for example made out of steel or other metal with a support arm 51 connected in it. One end of the nozzle 10 is connected to the hose 9 and the other end has an occlusion 53 connected to the support arm 51. The occlusion 53 defines together with the body 50 a slit 54. The slit 54 can have (but this is not mandatory) a convergent passage area from the inside of the body 50 to the outside thereof. During operation the reagent passes through the hose 9 and enters the body 50; then the reagent is injected into the inner space 3 of the boiler via the slit 54.

Figure 6:
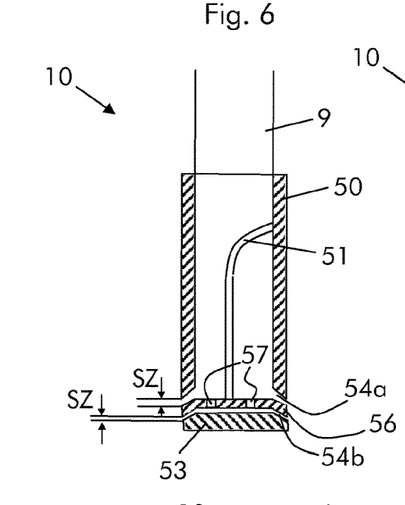
Figure 7:
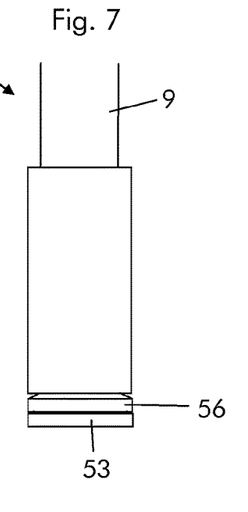
Figure 8:
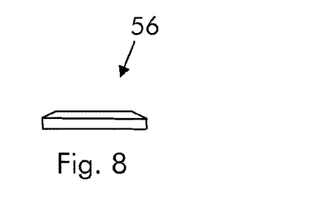

FIGS. 6 through 8 show a different embodiment of the nozzle 10. Also in this embodiment the nozzle 10 has a body 50 with a support arm 51 that supports one or more (in the example shown only one) intermediate discs 56 and the occlusion 53. The discs 56 are provided with openings 57 for the passage of the reagent. The disc 56 defines with the body 50 a first slit 54A and with the occlusion 53 a second slit 54B; the slits 54A and 54B can have the same size SZ but they may have different size SZ, such that the reagent injected through them forms droplets of different diameter that evaporate in different parts of the boiler (smaller droplets evaporate faster), in order to better distribute the reagent within the inner space 3. Naturally also more than one disc and thus more than two slits are possible.

Figures 9, 10:
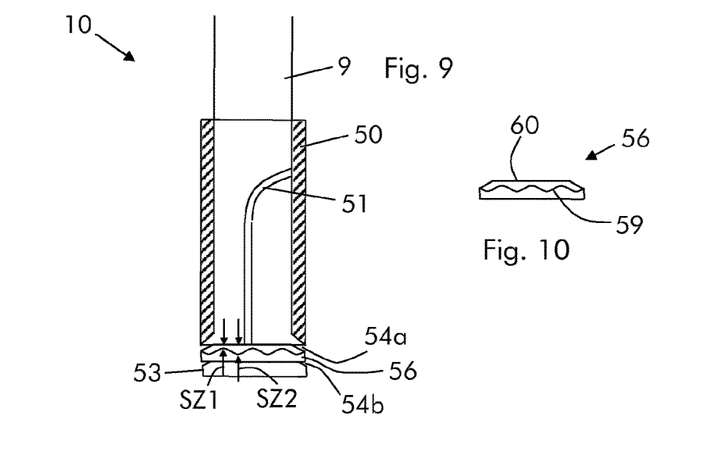

FIGS. 9 and 10 show a further example of the nozzle; in this embodiment the disc 56 has an outer border 59 that is not straight (like in the previous examples) but has a zig-zag or curved shape; the size of the slit changes over the border 59 from a minimum size SZ1 to a maximum size SZ2.

Naturally also embodiments with solutions combining those described above are possible, such that for example the zig-zag border can be provided only at the occlusion 53 or at both the disc 56 and occlusion 53 or instead of or in addition to the outer border 59, also the inner border 60 can have a zig-zag shape.

In addition or as an alternative to the nozzle features (e.g. numbers of slits and/or their configuration) the reagent distribution and evaporation can also be improved by the pulsed injection, controlled via the control system 44 and valves 45.

Figure 12:
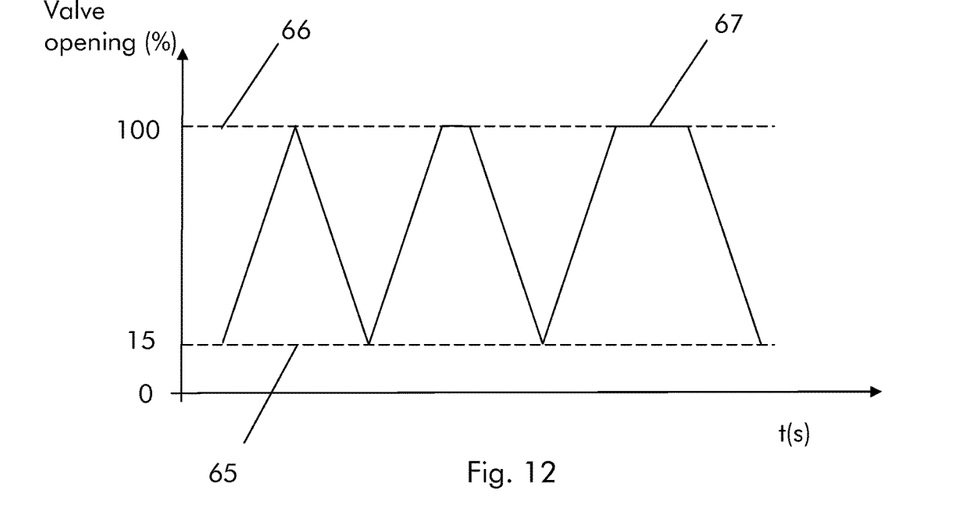
FIG. 12 shows the valve opening-time relationship for a pulsing injection of reagent.

FIG. 12 shows a relationship between the valve opening and time; it is clear that the minimum valve opening 65, the maximum valve opening 66, the duration of maximum opening 67 and the ramp frequency can be set according to the needs.

During operation, because of the varying volume flow, the exit velocity from the slits increases and/or decreases, this causes a change in the diameter of the reagent droplets. Droplets of different diameter evaporate differently such that with pulsing injection it is possible to achieve a larger evaporation zone than without it.

Figure 13:
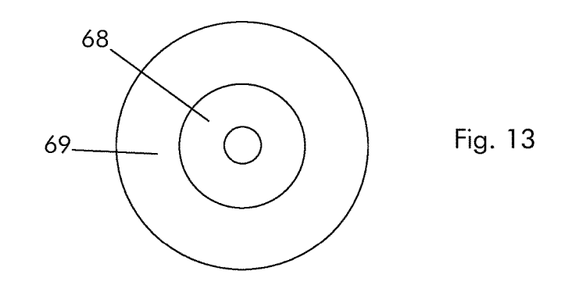
FIGS. 13 and 14 show the evaporation areas for different nozzles operated in different ways.
Figure 14:
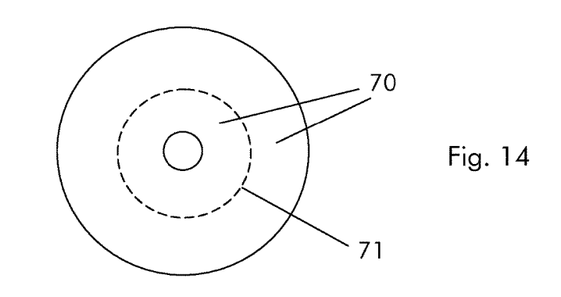

As a matter of example, FIGS. 13 and 14 show a view from the top of the area where the reagent droplets evaporate within the inner space 3; FIG. 13 refers to a nozzle embodiment with different slits 54A, 54B (for example the nozzle can have a configuration as shown in FIGS. 6-8) and FIG. 14 refers to a nozzle embodiment with pulsed reagent injection (for example the nozzle can have a configuration as shown in FIG. 5).

From FIG. 13 it is apparent that the droplets having a smaller diameter (e.g. injected through the slit 54B) evaporate faster than the droplets having a larger diameter (e.g. injected through the slit 54A). In this respect the annular area 68 indicates the zone where the droplets of smaller diameter evaporate and the area 69 indicate the zone where the droplet of larger diameter evaporate. From FIG. 13 it is apparent that the two (and possibly more than two) slits allow evaporation over a much larger area than in case only one slit is used.

FIG. 14 shows the zone 70 where evaporation of the reagent droplets occurs; also in this case it is apparent that the evaporation is much larger than without pulsation; as an example line 71 indicate the possible evaporation starting point in case no pulsation is used.

After injection and evaporation, the reagent mixes with the flue gas and carries out the known selective non catalytic reaction to remove $NO_x$ from the flue gas.

Naturally the features described may be independently provided from one another.

In practice the materials used and the dimensions can be chosen at will according to requirements and to the state of the art.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A boiler comprising:
    side tubed walls enclosing an inner space and a flame produced therein; and
    a device for selective non catalytic reduction, the device for selective non catalytic reduction including:
        a lance extending horizontally through one of the side tubed walls into the inner space and above the flame,
        a hose at least partially positioned within and extending through the lance, the hose including a portion extending within the inner space, perpendicular to the lance, and between the lance and the flame,
        at least one nozzle positioned on the portion of the hose extending within the inner space, and
        a hose drive mechanism for driving the hose within the lance.

2. The boiler of claim 1, wherein the lance includes a cooling system.

3. The boiler of claim 2, wherein the cooling system includes at least one channel for a cooling medium, the channel formed between a lance wall and the hose.

4. The boiler of claim 3, wherein the at least one channel of the cooling system includes:
    an inlet located at a portion of the lance positioned outside the inner space, and
    an outlet located at a portion of the lance positioned inside the inner space.

5. The boiler of claim 3, wherein the at least one channel of the cooling system includes:
    an inlet located at a portion of the lance positioned outside the inner space, and
    an outlet located at a portion of the lance positioned outside the inner space.

6. The boiler of claim 1, wherein the device for selective non catalytic reduction further includes a lance positioning system for regulating the position of the hose within the inner space.

7. The boiler of claim 6, wherein the lance positioning system is arranged for regulating the position of the lance over its longitudinal axis.

8. The boiler of claim 7, wherein the lance positioning system for regulating the position of the lance over its longitudinal axis includes:
    at least a lance support beam, and
    a chariot movable on the support beam,
    wherein the lance is connected to the chariot movable with respect to the support beam.

9. The boiler of claim 8, further comprising a drum carrying the hose, wherein the chariot supports a hose drive mechanism.

10. The boiler of claim 2, wherein the hose is positioned within and extends through the at least one channel of the cooling system.

11. A device for selective non catalytic reduction comprising:
    a lance including a cooling system, the cooling system including:
        at least one channel at least partially defined by a lance wall of the lance;
    a hose including:
        a first portion positioned within and extending through the lance, the first portion of the hose at least partially defining the at least one channel of the cooling system included in the lance, and
        a second portion extending outside of and perpendicular to the lance;
    at least one nozzle positioned on the second portion of the hose extending outside of and perpendicular to the lance; and
    a hose drive mechanism for driving the hose within the lance.

12. The device for selective non catalytic reduction of claim 11, wherein the first portion of the hose is positioned within the at least one channel of the cooling system.

13. The device for selective non catalytic reduction of claim 11, further comprising a lance positioning system for regulating the position of the hose within the inner space.

14. The device for selective non catalytic reduction of claim 13, wherein the lance positioning system is arranged for regulating the position of the lance over its longitudinal axis.

15. The device for selective non catalytic reduction of claim 11, further comprising a side drive mechanism for adjusting the side position of the lance.

* * * * *